US011192815B2

(12) United States Patent
Fujii et al.

(10) Patent No.: US 11,192,815 B2
(45) Date of Patent: Dec. 7, 2021

(54) METHOD FOR MANUFACTURING BENT SUBSTRATE AND BENT SUBSTRATE

(71) Applicant: AGC Inc., Chiyoda-ku (JP)

(72) Inventors: Makoto Fujii, Tokyo (JP); Satoshi Kanasugi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 566 days.

(21) Appl. No.: 15/977,396

(22) Filed: May 11, 2018

(65) Prior Publication Data

US 2018/0327301 A1 Nov. 15, 2018

(30) Foreign Application Priority Data

May 12, 2017 (JP) .............................. JP2017-095985

(51) Int. Cl.
*C03B 23/023* (2006.01)
*C03B 23/035* (2006.01)
*C03B 23/025* (2006.01)

(52) U.S. Cl.
CPC ...... *C03B 23/0235* (2013.01); *C03B 23/0252* (2013.01); *C03B 23/0256* (2013.01);
(Continued)

(58) Field of Classification Search
CPC ..... Y10T 428/24355; Y10T 428/24364; Y10T 428/24446; Y10T 428/24628;
(Continued)

(56) References Cited

U.S. PATENT DOCUMENTS

2011/0247365 A1* 10/2011 Hayakawa ............ C03B 11/086
65/66
2012/0058303 A1* 3/2012 Gabel ................. C03B 23/0305
428/141
(Continued)

FOREIGN PATENT DOCUMENTS

EP 2 457 881 A1 5/2012
JP 4-63817 10/1992
(Continued)

OTHER PUBLICATIONS

Quick guide to surface roughness measurement. Mitutoyo (Year: 2016).*

*Primary Examiner* — Z. Jim Yang
*Assistant Examiner* — Zheren Jim Yang
(74) *Attorney, Agent, or Firm* — Oblon, McClelland, Maier & Neustadt, L.L.P.

(57) ABSTRACT

A method for manufacturing a bent substrate, which forms a bent part in at least a part of a substrate, in which the substrate includes a second region and a first region, the method for manufacturing including: supporting the first region of the substrate on a substrate support surface of a support member including a mold surface having a same curved surface shape as that of the bent part and the substrate support surface that supports the first region, in a state of facing the second region of the substrate to the mold surface; heating the second region of the substrate to soften the second region of the substrate by the heating; placing the second region along the mold surface of the support member by an own weight of the second region; and transferring the curved surface shape of the mold surface to the second region by an external force.

21 Claims, 7 Drawing Sheets

(52) U.S. Cl.
CPC ...... C03B 23/0258 (2013.01); C03B 23/0357 (2013.01); *Y10T 428/24355* (2015.01); *Y10T 428/24479* (2015.01); *Y10T 428/24777* (2015.01)

(58) Field of Classification Search
CPC ..... Y10T 428/24653; Y10T 428/24669; Y10T 428/24686; Y10T 428/24694–24727; C03B 23/0252; C03B 23/0256; C03B 23/0258; G06F 3/041–045; G06F 3/0412; G06F 1/1626; G06F 1/1637–1654; B32B 3/26; B32B 3/28
See application file for complete search history.

(56) References Cited

U.S. PATENT DOCUMENTS

| | | | | |
|---|---|---|---|---|
| 2012/0202677 A1* | 8/2012 | Shimada | ........... | C03C 3/087 501/70 |
| 2012/0251743 A1* | 10/2012 | Amin | ........... | C03C 3/093 428/34.4 |
| 2012/0329525 A1* | 12/2012 | Hashimoto | ........... | C03C 15/00 455/566 |
| 2013/0052414 A1* | 2/2013 | Dobbins | ........... | C03B 17/065 428/141 |
| 2013/0086948 A1* | 4/2013 | Bisson | ........... | C03B 23/0258 65/106 |
| 2013/0323444 A1* | 12/2013 | Ehemann | ........... | C03B 23/023 428/34.4 |
| 2013/0337224 A1* | 12/2013 | Odani | ........... | C03C 3/097 428/130 |
| 2014/0065366 A1* | 3/2014 | Joubaud | ........... | C03B 23/023 428/141 |
| 2014/0102144 A1* | 4/2014 | Yamanaka | ........... | C03C 21/006 65/30.14 |
| 2014/0170391 A1* | 6/2014 | Hongo | ........... | G02F 1/133308 428/172 |
| 2014/0234581 A1* | 8/2014 | Immerman | ........... | C03B 23/0235 428/141 |
| 2014/0335322 A1* | 11/2014 | Luo | ........... | C03B 23/0307 428/177 |
| 2016/0031737 A1* | 2/2016 | Hoppe | ........... | C03B 23/0086 428/187 |
| 2016/0031753 A1* | 2/2016 | Maschmeyer | ........... | B32B 17/10036 428/141 |
| 2016/0039705 A1* | 2/2016 | Kato | ........... | C03B 35/145 428/174 |
| 2016/0137550 A1* | 5/2016 | Murata | ........... | C03C 21/002 428/141 |
| 2017/0059749 A1* | 3/2017 | Wakatsuki | ........... | C03B 23/02 |
| 2018/0022630 A1* | 1/2018 | Fukushi | ........... | C03B 23/0302 65/30.14 |
| 2018/0040778 A1* | 2/2018 | Ueda | ........... | H01L 33/58 |
| 2018/0134614 A1* | 5/2018 | Hall | ........... | C03B 23/0357 |
| 2019/0025620 A1* | 1/2019 | Tuan | ........... | G02F 1/13452 |
| 2020/0262743 A1* | 8/2020 | Kim | ........... | C03C 23/0075 |

FOREIGN PATENT DOCUMENTS

| | | |
|---|---|---|
| JP | 5831591 | 12/2015 |
| JP | 5897594 | 3/2016 |

\* cited by examiner

METHOD FOR MANUFACTURING BENT SUBSTRATE AND BENT SUBSTRATE

TECHNICAL FIELD

The present invention relates to a method for manufacturing a bent substrate, and a bent substrate.

BACKGROUND ART

Technique of heating a flat-shaped glass and forming the glass into a desired shape is known (for example, see Patent Documents 1 to 3). Patent Document 1 describes the technique of heating a deforming part to a temperature relatively lower than the temperature of a conventional method, maintaining the portion corresponding to a smooth surface part at low temperature, and forming a glass plate at deformation speed controlled to a rate lower than the conventional method.

Patent Document 2 describes a method for manufacturing a cover glass for a flat panel display, including a heating step of heating a glass plate, a locally heating step of locally heating a region to be a bent part of the glass plate, and a bending step of bending the glass plate by its own weight in the region to be a bent part during the locally heating step or after the locally heating step.

Patent Document 3 describes a method for forming a shaped article, including a step of heating a sheet of material to a first temperature range, a step of heating a reformable region of the sheet of material to a second temperature range, and a step of reforming the reformable region of the sheet of material into a selected shape by sagging of the reformable region of the sheet of material by its own weight or applying a force to the sheet of material outside the reformable region or near the boundary of the reformable region.

PRIOR ART DOCUMENT

Patent Document

Patent Document 1: JP-B-H4-63817
Patent Document 2: Japanese Patent No. 5831591
Patent Document 3: Japanese Patent No. 5897594

SUMMARY OF THE INVENTION

Problems that the Invention is to Solve

However, the method of Patent Document 1 deforms a glass while decreasing the thickness of the glass by press forming using upper and lower dies or vacuum forming. Therefore, thickness variation of a glass plate may be still large.

The method of Patent Document 2 performs a bending step by its own weight of a glass plate. Therefore, the method had a problem that a glass plate having a complicated bent part is difficult to be accurately manufactured.

The method of Patent Document 3 positively deforms a glass plate by applying external force. Therefore, the method had problems that wrinkles and the like are easy to be generated on a glass plate, and a glass plate having a complicated bent part is difficult to be accurately manufactured.

In view of the above circumstances, the present invention has an object to provide a method for manufacturing a bent substrate that can form a bent substrate having a bent part in high accuracy without involving large change of a plate thickness and without receiving restriction on a shape of a bent part, and a bent substrate manufactured by the method.

Means for Solving the Problems

The present invention includes the following constituents.
(1) A method for manufacturing a bent substrate, which forms a bent part in at least a part of a substrate, in which the substrate includes a second region which is subjected to forming and includes the bent part and a first region which is not subjected to forming, the method for manufacturing including:
supporting the first region of the substrate on a substrate support surface of a support member including a mold surface having a same curved surface shape as that of the bent part and the substrate support surface that supports the first region, in a state of facing the second region of the substrate to the mold surface;
heating the second region of the substrate to soften the second region of the substrate by the heating;
placing the second region along the mold surface of the support member by an own weight of the second region; and
transferring the curved surface shape of the mold surface to the second region by an external force.
(2) A bent substrate having a bent part in at least a part thereof, in which
the bent substrate has a one main surface and the other main surface opposite to the one main surface, and
a surface roughness of the bent part on the one main surface of the bent substrate is larger than the surface roughness of a region other than the bent part on the one main surface.

Advantageous Effect of the Invention

According to the present invention, a bent substrate having a bent part can be formed in high accuracy without involving large change of a plate thickness and without receiving restriction on a shape of the bent part.

MODE FOR CARRYING OUT THE INVENTION

Figure 1:
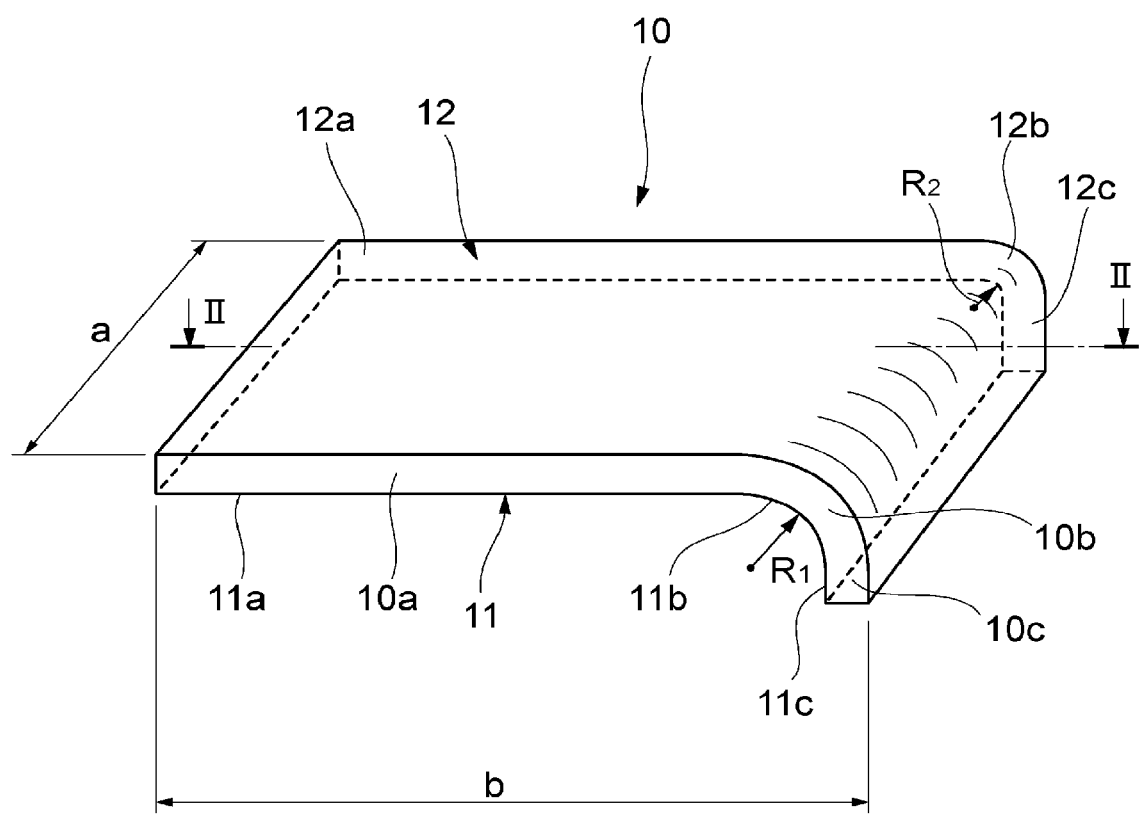
FIG. 1 is a perspective view schematically illustrating an appearance of a bent substrate.
Figure 2:
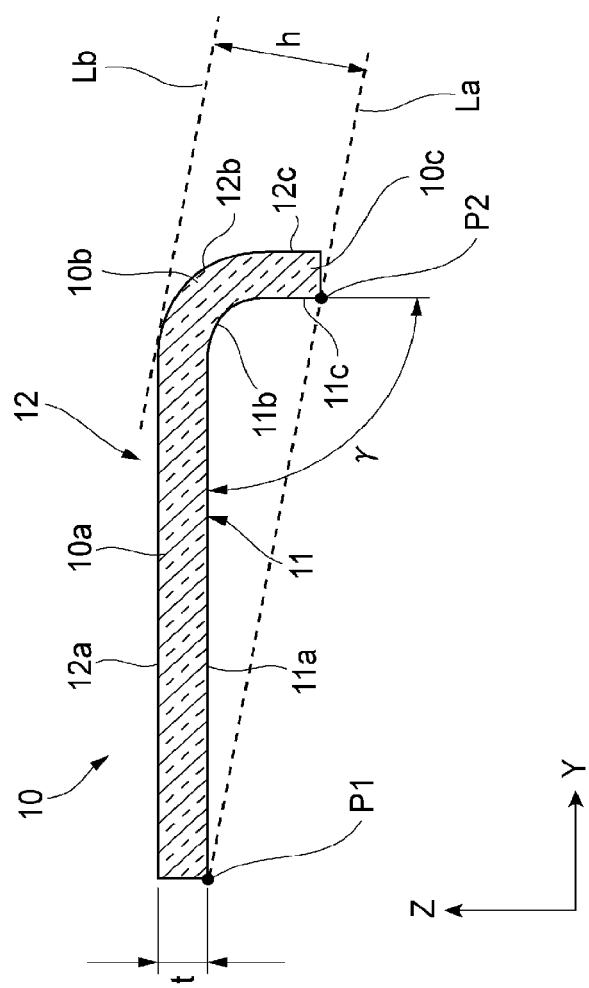
FIG. 2 is a cross-sectional view taken long a II-II line in FIG. 1.

An embodiment of the present invention is described in detail below by reference to the drawings.
FIG. 1 is a perspective view schematically illustrating an appearance of a bent substrate 10, and FIG. 2 is a cross-sectional view taken along a II-II line in FIG. 1.
The bent substrate 10 is a plate material having one main surface 11 (lower surface in the drawing), and the other main surface 12 (upper surface opposite to the main surface 11 in the drawing). The bent substrate 10 is a substrate having a three-dimensionally curved shape, and has a bent part in at least a part thereof. The "bent part" used herein means the part in which its average curvature radius is not infinite, and means a region having a curvature radius of 1,000 mm or less. The "flat part" used herein means a region having curvature radius exceeding 1,000 mm. In the bent substrate 10 of the present constitution, flat parts, which are facing each other, of other than the bent part of the main surface 11 and the main surface 12 are parallel to each other, but are not always required to be parallel to each other.

The bent substrate 10 of the present constitution has, from one end toward other end in Y direction, a first plane part 10a parallel to XY plane, a bent part 10b connected to the first plane part 10a and bent in Z direction (lower side in the drawing), and a second plane part 10c connected to the bent part 10b and extended to other end (right side in the drawing) in Y direction.

The one main surface 11 of the bent substrate 10 has a first plane part 11a parallel to XY plane, a bent part 11b connected to the first plane part 11a and bent in Z direction (lower side in the drawing) and a second plane part 11c connected to the bent part 11b and extended to other end (right side in the drawing) in Y direction, so as to correspond to the first plane part 10a, the bent part 10b and the second plane part 10c, respectively.

Similarly, the other main surface 12 of the bent substrate 10 has a first plane part 12a parallel to XY plane, a bent part 12b connected to the first plane part 12a and bent in Z direction (lower side in the drawing) and a second plane part 12c connected to the bent part 12b and extended to other end (right side in the drawing) in Y direction, so as to correspond to the first plane part 10a, the bent part 10b and the second plane part 10c, respectively.

Curvature radius of the bent part 10b is preferably 500 mm or less, more preferably 100 mm or less, and still more preferably 20 mm or less. Even in a case of forming a bent substrate having small curvature radius that has been conventionally difficult to be formed, the bent substrate 10 where the bent part 10b having high accuracy is formed therein is obtained by a method for manufacturing a bent substrate described hereinafter.

The lower limit of curvature radius of the bent substrate 10b is not particularly limited, but is preferably 1 mm or more, more preferably 5 mm or more, and still more preferably 10 mm or more. When the curvature radius of the bent part is equal to or more than the lower limit, a design of a bent substrate smoothly connected to other members present on a periphery of the bent substrate is obtained. In addition, even in the case where an object collides with the bent part 10b, stress concentration can be reduced. As a result, impact resistance of the bent part 10b is improved.

For the bent substrate 10 having the first plane part 10a, the bent part 10b and the second plane part 10c, dimension in X direction thereof is defined as a, the dimension in Y direction thereof is defined as b, and the plate thickness thereof is defined as t. Furthermore, as shown in FIG. 2, the distance between both edges of the bent substrate 10 in a direction (Z direction in this embodiment) in which the bent substrate 10 has been bent is defined as a bending depth h. The bending depth h means the distance between a straight line $L_a$ connecting two edge parts P1 and P2 in the same main surface and a tangent line $L_b$ contacting the bent part, among straight lines parallel to the straight line $L_a$, in a cross-sectional view of a thickness direction of the substrate having the bent part.

The bending depth h of the bent part 10b is preferably 1,000 mm or less, more preferably 800 mm or less, still more preferably 500 mm or less, and particularly preferably 200 mm or less. When the bent substrate 10 has the bending depth of the upper limit or less, the bent substrate 10 where the bent part 10b having high accuracy is formed thereon is obtained by a manufacturing method described hereinafter, even in the case of the bent substrate 10 having the deep bending depth that has conventionally been difficult to be formed.

The bending depth h of the bent part 10b is not particularly limited, but is preferably 3 mm or more, more preferably 5 mm or more, still more preferably 10 mm or more, and particularly preferably 20 mm or more. When the bending depth h of the bent part is equal to or more than the lower limit, a design of a bent substrate smoothly connected to other members present on a periphery of the bent substrate is obtained. When material of the bent substrate is a glass, rigidity of the bent substrate is enhanced, deformation during an assembling step and careless deformation by pushing pressure with fingers during use can be suppressed.

At least one bent part 10b is formed in the bent substrate 10, and the position, number, shape and the like of the bent part 10b are not limited. For example, the bent part 10b may be a projecting curved shape in which one main surface 11 is a projecting surface, not a recessing curved shape in which one main surface 11 is a recessing curved shape as illustrated in FIG. 1.

As illustrated in FIG. 2, an angle formed at an intersection point where extension lines of the respective surfaces of the first plane part 11a and second plate part 11c of one main surface 11 cross is defined as an "opening angle γ". The opening angle γ of the bent substrate 10 is preferably 45° or more and 315° or less, and more preferably 90° or more and 270° or less (excluding the case of 180°).

The bent substrate 10 of the present constitution has a twist structure in which the shape of the bent part 10b changes along X direction. The "twist" used herein means a shape obtained under the conditions that the curvature radius in the bent part 10b is not required to be constant and the opening angle γ is not required to be constant. Specifically, when the cutting surface of the bent substrate 10 illustrated in FIG. 1 which is a plane parallel to XZ plane and vertical to X axis has been observed, the bent substrate 10 has the curvature radius and opening angle different in each position of X direction.

In other words, the bent part 11b on the one main surface 11 of the bent substrate 10 has a curved shape of a curvature radius $R_1$ and an opening angle $γ_1$ at the near side in FIG. 1 that is one edge part in X direction, and the bent part 11b has a curved shape of a curvature radius $R_2$ smaller than the curvature radius $R_1$ and an opening angle $γ_2$ at the far side in FIG. 1 that is the other edge in X direction. The bent part 11b has a shape where the curvature radius continuously changes from $R_1$ to $R_2$ along X direction, and has, for example, a shape obtained by applying twist to a flat plate material to bend it.

The bent substrate 10 of the present constitution may have at least one bent part 10b having a projecting curved shape and at least one bent part 10b having a recessing curved shape, in a cross-sectional view of a thickness direction. The bent substrate 10 of the present constitution may have a so-called "S-shaped structure" in a cross-sectional view of a thickness direction of the bent substrate 10. The "S-shaped" used herein means that in the case where the curvature radius of the bent part 10b is not constant, when the shape of the bent part 10b is divided into 100 equal parts in a cross-sectional view of a thickness direction of the bent substrate 10 and approximate curvature radius is calculated from continuous 3 points and arranged, both the part where the central point of the approximate curvature radius is a plus position in Z direction to the main surface 12 and the part where the central point is a minus position in Z direction to the main surface 12 are contained together.

The dimension a in X direction, the dimension b in Y direction, and the plate thickness t of the bent substrate 10 are not particularly limited. The plate thickness t is preferably nearly constant in the whole region of the bent substrate 10. The plate thickness t may partially change and may change in the whole region of the bent substrate 10.

Examples of the bent substrate 10 include a plate of a glass, ceramics, resins, woods, metal and the like. Of those, a glass is preferred. Examples of the glass include a colorless and transparent amorphous glass, a crystallized glass, a colored glass and the like.

In more detail, examples of the glass that can be used include alkali-free glass, soda lime glass, soda lime silicate glass, aluminosilicate glass, boron silicate glass, lithium aluminosilicate glass and borosilicate glass. Aluminosilicate glass is preferably used since large stress is easy to be imparted by a strengthening treatment described hereinafter even for an aluminosilicate glass having a small thickness, a glass being thin but having high strength is thus obtained, and such a glass is preferred as an article arranged at a visual side of an image display device.

Specific example of the glass composition includes a glass containing, in mol % in terms of oxides, 50 to 80% of $SiO_2$, 0.1 to 25% of $Al_2O_3$, 3 to 30% of $Li_2O+Na_2O+K_2O$, 0 to 25% of MgO, 0 to 25% of CaO and 0 to 5% of $ZrO_2$, but not particularly limited. More specifically, the following compositions of the glass are exemplified. For example, the term "containing 0 to 25% of MgO" means that MgO is not essential, but may be contained in an amount up to 25%.

(i) A glass containing, in mol % in terms of oxides, 63 to 73% of $SiO_2$, 0.1 to 5.2% of $Al_2O_3$, 10 to 16% of $Na_2O$, 0 to 1.5% of $K_2O$, 0 to 5% of $Li_2O$, 5 to 13% of MgO and 4 to 10% of CaO (ii) A glass containing, in mol % in terms of oxides, 50 to 74% of $SiO_2$, 1 to 10% of $Al_2O_3$, 6 to 14% of $Na_2O$, 3 to 11% of $K_2O$, 0 to 5% of $Li_2O$, 2 to 15% of MgO, 0 to 6% of CaO and 0 to 5% of $ZrO_2$, in which the total content of $SiO_2$ and $Al_2O_3$ is 75% or less, the total content of $Na_2O$ and $K_2O$ is 12 to 25%, and the total content of MgO and CaO is 7 to 15%

(iii) A glass containing, in mol % in terms of oxides, 68 to 80% of $SiO_2$, 4 to 10% of $Al_2O_3$, 5 to 15% of $Na_2O$, 0 to 1% of $K_2O$, 0 to 5% of $Li_2O$, 4 to 15% of MgO and 0 to 1% of $ZrO_2$ (iv) A glass containing, in mol % in terms of oxides, 67 to 75% of $SiO_2$, 0 to 4% of $Al_2O_3$, 7 to 15% of $Na_2O$, 1 to 9% of $K_2O$, 0 to 5% of $Li_2O$, 6 to 14% of MgO and 0 to 1.5% of $ZrO_2$, in which the total content of $SiO_2$ and $Al_2O_3$ is 71 to 75%, the total content of $Na_2O$ and $K_2O$ is 12 to 20%, and when CaO is contained, the content thereof is less than 1%

(v) A glass containing, in mass % in terms of oxides, 60 to 75% of $SiO_2$, 0.5 to 8% of $Al_2O_3$, 10 to 18% of $Na_2O$, 0 to 5% of $K_2O$, 6 to 15% of MgO and 0 to 8% of CaO (vi) A glass containing, in mass % in terms of oxides, 63 to 75% of $SiO_2$, 3 to 12% of $Al_2O_3$, 3 to 10% of MgO, 0.5 to 10% of CaO, 0 to 3% of SrO, 0 to 3% of BaO, 10 to 18% of $Na_2O$, 0 to 8% of $K_2O$, 0 to 3% of $ZrO_2$ and 0.005 to 0.25% of $Fe_2O_3$, in which $R_2O/Al_2O_3$ (in which $R_2O$ is $Na_2O+K_2O$) is 2.0 or more and 4.6 or less (vii) A glass containing, in mass % in terms of oxides, 66 to 75% of $SiO_2$, 0 to 3% of $Al_2O_3$, 1 to 9% of MgO, 1 to 12% of CaO, 10 to 16% of $Na_2O$ and 0 to 5% of $K_2O$ For the glass plate used as the bent substrate 10, the total content of $Li_2O$ and $Na_2O$ in its glass composition is preferably 12 mol % or more in order to appropriately perform a chemical strengthening treatment described hereinafter. A glass transition point decreases and forming becomes easy as the content of $Li_2O$ in the glass composition increases. Therefore, the content of $Li_2O$ is preferably 0.5 mol % or more, more preferably 1 mol % or more, and still more preferably 2 mol % or more. The glass composition preferably contains 60 mol % or more of $SiO_2$ and 8 mol % or more of $Al_2O_3$ in order to increase a surface compressive stress (Compressive Stress: hereafter simply referred to as CS in some cases) layer and a depth of a surface compressive stress layer (Depth of Layer: hereinafter simply referred to as DOL in some cases).

When the glass plate is colored and used, a colorant may be added in a range that does not inhibit achievement of desired chemical strengthening properties. Examples of the colorant include $Co_3O_4$, MnO, $MnO_2$, $Fe_2O_3$, NiO, CuO, $Cu_2O$, $Cr_2O_3$, $V_2O_5$, $Bi_2O_3$, $SeO_2$, $TiO_2$, $CeO_2$, $Er_2O_3$, $Nd_2O_3$ and the like which are metal oxides of Co, Mn, Fe, Ni, Cu, Cr, V, Bi, Se, Ti, Ce, Er and Nd, having absorption in a visible region.

When a colored glass is used as the glass plate, a coloring component (at least one component selected from the group consisting of metal oxides of Co, Mn, Fe, Ni, Cu, Cr, V, Bi, Se, Ti, Ce, Er and Nd) may be contained in the glass in an amount of 7% or less in mol % in terms of oxides. When the content of the coloring component exceeds 7%, the glass is easy to cause devitrification. The content of the coloring component is preferably 5% or less, more preferably 3% or less, and still more preferably 1% or less. The glass plate may further contain $SO_3$, a chloride, a fluoride and the like appropriately as a refining agent during melting.

A method for manufacturing a flat plate-shaped glass that can be used as a material of the bent substrate 10 is described below. Raw materials for each component are prepared so as to obtain the composition described before, and heated and melted in a glass melting furnace. The resulting glass is homogenized by bubbling, stirring, addition of a fining agent, and the like, and a glass plate having a predetermined thickness is prepared by a conventional forming method and then annealed. Examples of the method for manufacturing a glass include a float process, a pressing process, a fusion process, a downdraw process and a roll out process. A float process suitable for mass production is particularly preferred. Furthermore, a continuous manufacturing process other than a float process, such as a fusion process and a downdraw process, is also preferred. The glass plate manufactured into a flat plate shape by an optional manufacturing process is annealed and then cut into a desired size. Thus, a flat plate-shaped glass is obtained. When further accurate dimensional accuracy is required, polishing/grinding, edge processing and piercing described hereinafter may be applied to the glass plate after cutting. By the processing, breakage and cracking can be reduced in handling in a heating step or the like, thereby the yield can be improved.

The bent substrate 10 may have a treating layer. The treating layer is not particularly limited. Example of the treating layer includes an antiglare layer bringing the effect of scattering reflected light and reducing glare of reflected light due to reflection of a light source. The treating layer may be formed by processing the main surface of the bent substrate 10 itself and may be separately formed by a deposition processing method. As the method for forming the treating layer, for example, a surface treatment is applied to at least a part of the bent substrate 10 by chemical treatment or physical treatment. In the case of an antiglare layer, a method for forming a recessed and projected shape having desired surface roughness can be used. Furthermore, a recessed and projected shape may be formed on at least a part of the bent substrate 10 by a deposition treatment method that applies or sprays a treating liquid or a thermal treatment method such as forming. Other than the above, an antireflective later (AR layer) or an anti-finger print layer (AFP layer) may be formed as a treating layer.

When the bent substrate 10 is a glass, the thickness t of the glass used for forming is preferably 0.5 mm or more and 5 mm or less. When the glass having a thickness of the lower limit or more is used, the bent substrate 10 having high strength and satisfactory quality texture is obtained. The thickness t of the glass is preferably 0.7 mm or more and 3 mm or less, and more preferably 1 mm or more and 3 mm or less.

(Forming Apparatus)

An example of a forming apparatus for manufacturing the bent substrate 10 as above is described below.

In the forming apparatus, one end part of a flat substrate as a material of the bent substrate 10 is bent to form a twist structure as illustrated in FIG. 1.

Figure 3:
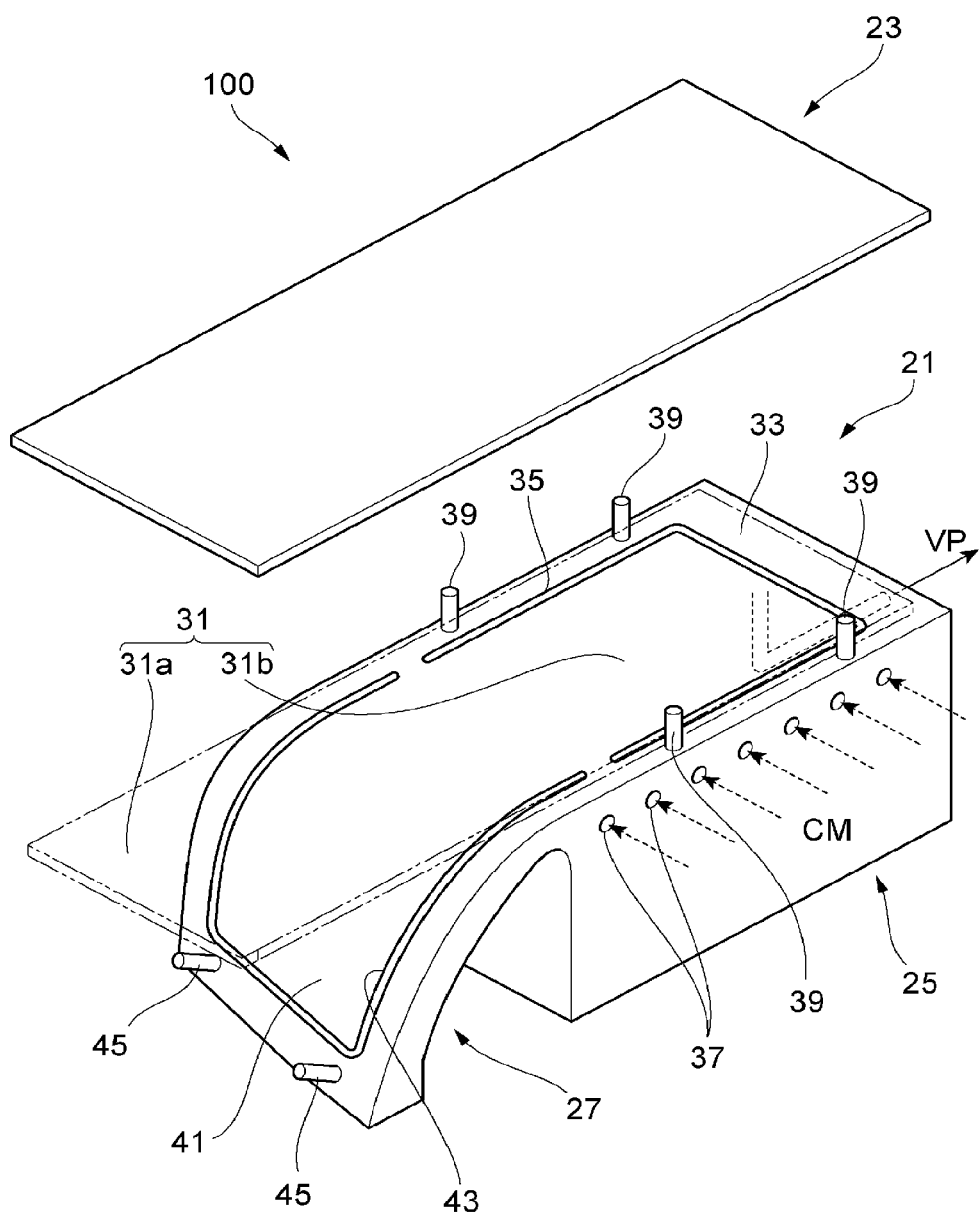
FIG. 3 is a schematic structural view of a forming apparatus.
(A) to (D) of FIG. 4 are step explanation views stepwisely illustrating the order of forming of a bent part.

FIG. 3 is a schematic structural view of a forming apparatus 100.

The forming apparatus 100 comprises a support member 21 and a heater 23 arranged above the support member 21. Control section (not shown) integrating and controlling each section may be connected to the forming apparatus 100. The support member 21 comprises a base section 25 and a bent part forming section 27 extended from one end part of the base section 25. Flat substrate 31 as a material of a bent substrate is arranged on the upper surface of the base section 25 and bent part forming section 27.

In the base section 25, the upper surface thereof is a substrate supporting surface 33, and supports a first region 31*b* which is a region except for a region (second region 31*a* to be formed) for forming a bent part of the substrate 31. Groove 35 as a recessed part adsorbing the substrate 31 by vacuum suction is formed on the substrate supporting surface 33. The groove 35 is continuously formed along outer edge of the substrate 31 on the substrate supporting surface 33, and is arranged in U-shape as planar view in the embodiment shown in the drawing. The groove 35 is connected to a vacuum pump VP not shown, and vacuum adsorption of the substrate 31 can be performed by driving the vacuum pump VP.

Material of the support member 21 is preferably a metal having oxidation resistance such as stainless steel, a glass such as fused silica glass, ceramics, carbon and the like. Of those, a glass such as fused silica glass, and carbon are more preferred. Fused silica glass has high durability at high temperature and in an oxidizing atmosphere, and is difficult to generate defects on the substrate 31 bringing into contact therewith. As a result, a bent glass having less flaws on the surface thereof is obtained. Carbon has high thermal conductivity, and thus a bent glass can be efficiently manufactured. A coating film of a metal, an oxide, carbon or the like may be formed on the surface of the support member 21 facing the substrate 31.

Pins 39 for prevention of deviation of the substrate 31 stand on the substrate supporting surface 33. The pins 39 are brought into contact with at least two sides of the substrate 31 and regulate movement in in-plane direction.

A plurality of through-holes 37 for cooling as cooling flow paths are formed on the base section 25 in the lower part of the substrate supporting surface 33. Cooling medium CM such as water, oil or cooling air is supplied to the through-holes 37 for cooling from a pump not shown. The plurality of through-holes 37 for cooling have the same cross-section area and are arranged at equal intervals. As a result, the substrate supporting surface 33 is evenly cooled. Flow path inlets at inflow side of the through-holes 37 for cooling and flow path outlets at outflow side thereof have a circular shape or an elliptical shape in a cross-sectional view of a flow direction in order to decrease pressure loss and increase cooling efficiency of the base section.

The bent part forming section 27 is extended in a small thickness from the base section 25, and a mold surface 41 which is an upper surface thereof has the same curved shape as the bent part of the bent substrate. The substrate 31 is supported on the base section 25 in the state where the second region 31*a* faces to the mold surface 41.

Groove 43 as a recessed part is formed on the mold surface 41 of the bent part forming section 27. The groove 43 is continuously formed corresponding to an outer edge shape of the second region 31*a* of the substrate so as to be covered with the outer edge. In the embodiment shown in the drawing, the groove 43 is arranged in U-shape in a planar view. The groove 43 is connected to a vacuum pump VP not shown in a similar manner with the groove 35.

In the grooves 35 and 43, start and stop of vacuum suction are controlled by open and close of electromagnetic valves provided in the each groove, manually or based on the order from a control section. Vacuum suction by the grooves 35 and 43 are not always required to be performed, and is performed as necessary.

Stoppers 45 for prevention of positional deviation of the substrate 31 are provided at the tip of the bent part forming section 27. The stopper 45 may have a shape such as a plate shape or a block shape, other than a simple pin shown in the drawing.

The bent part forming section 27 has a thinning structure formed in a thickness smaller than that of the base section 25. Therefore, heat capacity thereof is smaller as compared with that of the base section 25, and temperature change of the substrate 13 by the contact with the bent part forming section 27 can be suppressed.

The support member 21 having the base section 25 and the bent part forming section 27 may be arranged on an inclined stage not shown, and may have a structure capable of inclining the whole in an optional direction.

As the heater 23, radiation heaters such as a sheath heater, a quartz tube heater, a nichrome wire heater, an iron chromium heater, a halogen heater, a near infrared heater and a mid-infrared heater, and various heaters can be used. A short wavelength infrared heater having high heating efficiency can be preferably used.

When the heater 23 comprises local heaters arranged in plural places, preset temperatures may be changed in the respective local heaters. For example, the preset temperatures of local heaters may be set so as to increase with approach to the tip of the bent part forming section 27 than the preset temperature at the side near the base section 25. Thereby, the second region 31*a* can be intensively heated while suppressing heating to the first region 31*b* of the substrate 31. Furthermore, the distance between the heater 23 and the substrate 31 may be appropriately adjusted.

The first region 31*b* of the substrate 31 may be flat and may form a loose curved surface by carrying out the forming at low temperature.

(Formation of Bent Part)

Procedures for forming a bent part on a substrate are described below. A method for forming a bent part of the present invention can manufacture the bent substrate 10 having a twist structure and S-shape in a cross-sectional view of a thickness direction with excellent accuracy of curvature radius of a bent part and dimension of a bent substrate. The method is particularly preferable to be used in manufacturing a large-sized bent substrate 10 having a short side of 200 mm or more.

Figure 4:
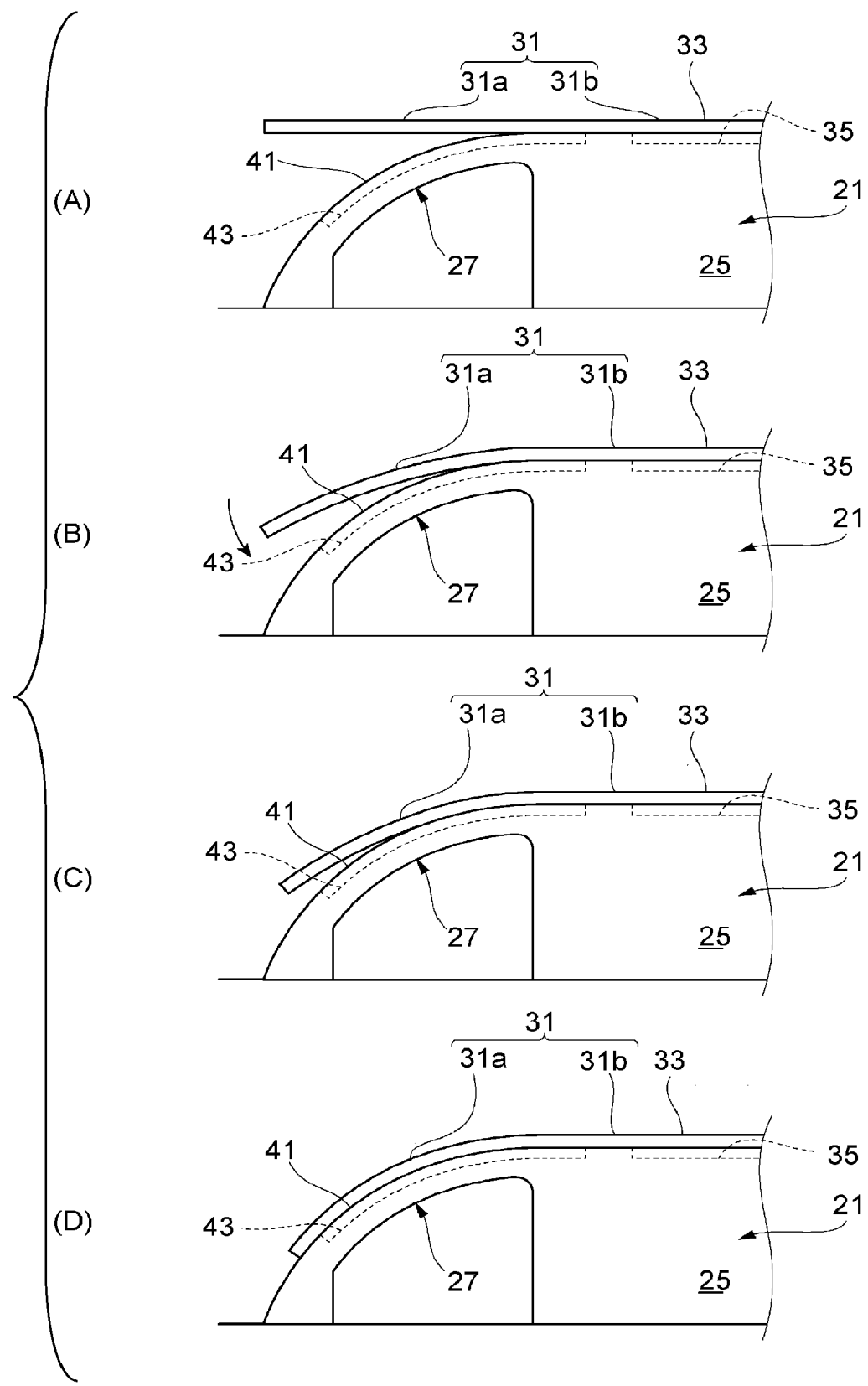

(A) to (D) of FIG. 4 are step explanation views stepwise illustrating one example of the order of forming of a bent part. As shown in (A) of FIG. 4, the rectangular substrate 31 is moved or conveyed on the support member 21, and the substrate 31 is placed on the support member 21 such that any one of the main surfaces of the substrate 31 is brought into contact with the support member 21. At this time, the edge surface in a short axis direction of the first region 31b of the substrate 31 is positioned by the pins 39 or an appropriate hook-shaped member (not shown). Furthermore, the substrate is positioned at a position at which the edge surface in a long axis direction of the substrate 31 abuts on pins, utilizing gravity by inclining the base section 25.

Thereafter, preparation such as covering the circumference of the support member 21 with a cover is conducted as necessary. The cover covering the support member 21 is effective in maintaining the periphery of the support member 21 clean, and can be constituted of, for example, a metal plate such as stainless steel. The cover may be made of a material such as a glass or ceramics, and may be made of a material having the same composition as the material of the support member 21.

The substrate 31 may be preheated after placing the substrate 31 on the support member 21. Alternatively, the preheating may be conducted by placing the substrate 31 on the support member 21 heated previously.

In the preheating of the substrate 31, the substrate 31 is heated to, for example, about 500° C. that is lower than a softening point and at which equilibrium viscosity reaches about $10^{17}$ Pa·s. Thereby, the generation of damages such as cracking generated in the case of rapidly heating the substrate 31 to the vicinity of the softening point can be prevented.

During preheating, in the case where the support member 21 is heated beforehand, the temperature of the bent part forming section 27 of the support member 21 is set to be higher than the temperature of the base section 25 of the support member 21. To make a temperature difference between the bent part forming section 27 and the base section 25 of the support member 21, the temperature can be controlled by, for example, heating the bent part forming section 27 to a temperature higher than that of the base section 25 or cooling the base section 25 to a temperature lower than that of the bent part forming section 27. The temperature of the support member 21 can be controlled, for example, such that the temperature of the bent part forming section 27 is 400 to 500° C. and the temperature of the base section 25 is 300 to 400° C. This is effective to further increase the temperature difference between the second region 31a and the first region 31b during heating for forming in the post step, and is a temperature range in which a glass does not suffer a heat-break by the temperature difference between the second region 31a and the first region 31b.

As shown in (B) of FIG. 4, the heater 23 is heated, and the second region 31a of the substrate 31 is heated to a glass transition temperature or higher and a melting point or lower, or until the equilibrium viscosity of the substrate 31 reaches $10^{17}$ Pa·s or less. The first region 31b of the substrate 31 is heated to a glass transition temperature or lower.

The heating temperature of the substrate 31 by the heater 23 is preferably 600 to 1,100° C., and more preferably 650 to 850° C., in the case where the substrate 31 is a glass. The substrate 31 is preferably heated such that the equilibrium viscosity thereof reaches $10^{3.9}$ to $10^{11.9}$ Pa·s. Thereby, the heated substrate 31 is formed into a bent glass having a desired shape given thereto. In order that the finally obtained bent glass has satisfactory optical quality and shape deviation from a desired design dimension is decreased, the temperature is more preferably 650 to 900° C., and the equilibrium viscosity is more preferably $10^{5.5}$ to $10^{10}$ Pa·s.

When the second region 31a of the substrate 31 is heated to a glass transition point or higher, it is softened and sagged downward by its own weight. As shown in (C) of FIG. 4, a part of the second region is brought into contact with the mold surface 41 of the bent part forming section 27 and deformed into a shape along the mold surface 41.

In more detail, for example, it is preferable that the first region 31b of the substrate 31 is heated to the temperature of 670° C. or lower and the equilibrium viscosity of $10^{9.5}$ Pa·s or more. Thereby, flatness of the first region 31b can be maintained. Furthermore, it is more preferable that the first region 31b of the substrate 31 is heated to the temperature of 550° C. or lower and the equilibrium viscosity of $10^{14.3}$ Pa·s or more. In this case, to suppress cracking of the substrate 31, it is more preferable that the first region 31b of the substrate 31 is heated to the temperature of 400° C. or more and the equilibrium viscosity of $10^{33.6}$ Pa·s or less.

On the other hand, for example, the second region 31a is preferably heated such that the temperature is 600 to 1,110° C. and the equilibrium viscosity is $10^{3.9}$ to $10^{11.9}$ Pa·s.

Furthermore, it is preferable that the temperature of the bent part forming section 27 of the support member 21 is controlled to be higher than the desired temperature of the second region 31a of the substrate 31.

When the second region 31a sags by its own weight and a deformation rate in a vertical direction at the lowest point is regarded as a sagging rate, the second region is deformed by its own weight until the sagging rate reaches 5 mm/sec or less. Thereby, when using external force in the post step, the influence of wrinkles or the like by applying excessive external force to the bent part can be reduced, and a bent glass is obtained efficiently. The upper limit of the sagging rate while the second region 31a sags by its own weight is more preferably 1 mm/sec or less, and still more preferably 0.5 mm/sec or less.

The lower limit of the sagging rate while the second region 31a sags by its own weight is not particularly limited, but is preferably 0.01 m/sec or more, and more preferably 0.05 mm/sec or more.

The sagging rate can be obtained by, for example, detecting the movement of the substrate 31 by a camera photographing the forming apparatus 100 from the outside or various conventional sensors, and calculating the amount of the detected movement by a control unit. The control unit adjusts driving timing of each part such as a vacuum pump, an electromagnetic valve or a heater according to the sagging rate obtained. The control unit may actively control such that the sagging rate increases or decreases, such as by changing the preset temperature of the heater 23.

After the completion of deformation of the second region 31a by its own weight as above, the second region is deformed by a forming method using external force. As the deformation means that can be used, a desired forming method may be selected from a differential pressure forming method (vacuum forming method), a press forming method and the like according to the shape of a bent glass that is desired to be finally obtained.

A differential pressure forming method is used in the present embodiment. The second region 31a of the substrate 31 is vacuum sucked from the groove 43 of the bent part forming section 27 at the timing that the sagging rate of the second region 31a of the substrate 31 reaches 5 mm/sec or less, and thus the second region 31a is closely contacted with the mold surface 41. The substrate 31 is cooled in the state of closely contacting the bent part forming section 27, and a curved shape of the mold surface 41 is transferred to the second region 31a.

In the deformation of the substrate 31, radiation heating or convection heating is preferably utilized as the heating method.

The radiation heating is a method of heating a material to be heated by absorbing energy radiated from a heat source such as a heater. Thereby, because heating-cooling cycle can be shortened in mass production of a bent glass, tact time of deformation can be shortened. As a result, production efficiency of a bent glass can be improved.

The convection heating is a method of heating a material to be heated by convection of an atmospheric gas. Thereby, in-plane temperature distribution of the substrate 31 can be homogenized, properties of the treating layer on the bent glass finally obtained are easy to be maintained, and as a result, production efficiency of a bent glass can be improved.

In order to take out the bent glass after deforming the substrate 31, the bent substrate is cooled to a temperature capable of performing handling, such as around room temperature. Cooling is preferably carried out stepwise, and it is preferred to have an annealing step having controlled cooling rate and then a quenching step that does not control a cooling rate.

In the annealing step, the substrate is cooled by controlling a cooling rate from a forming temperature to 600° C. or lower (equilibrium viscosity is $10^{11.9}$ Pa·s or more). Thereby, in-plane residual stress can be reduced, and the effect that the substrate is difficult to be cracked in the post step is achieved. The final temperature of the annealing step is more preferably 570° C. or lower (equilibrium viscosity is $10^{13.2}$ Pa·s or more).

The cooling rate in the annealing step is preferably 15° C./min or less. The reason for this is that in-plane residual stress can be reduced and the substrate is difficult to be cracked in the post step. The cooling rate is more preferably 10° C./min or less, and still more preferably 5° C./min or less.

In the quenching step, after reaching the final temperature in the annealing step, the cooling rate is not particularly controlled, and cooling is conducted to the temperature capable of taking out the bent glass. The temperature capable of taking out is preferably room temperature or higher and 400° C. or lower.

In the cooling step of the substrate 31, accuracy of a bent shape of the substrate 31 can be improved by continuing vacuum suction from the groove 43 until the substrate 31 is cooled to a temperature free of difficulty of handling. Furthermore, by stopping vacuum suction in the stage entering the cooling step, the contact of the substrate 31 with the mold surface 41 can be reduced, and as a result, the formation of unevenness on the glass surface can be reduced. Additionally, by stopping vacuum suction in the course of the cooling step, unevenness on the glass surface can be reduced while improving the accuracy of a bent shape.

By the above steps, a bent substrate where the second region 31a is formed into a desired bent shape and the first region 31b is maintained in a flat shape is obtained from the flat-shaped substrate 31.

The annealing step may be applied to the bent glass having a desired shape given thereto after the completion of the above forming step.

In the present invention, temperature history is a varied state in the same glass when manufacturing a bent glass. For this reason, the bent glass may naturally break after forming by the influence of stress strain and may break in post-processing. In particular, as in the bent glass in the present invention, this is remarkable in a complicated and large-sized glass having a twist structure or an S-shaped structure in a thickness direction in a cross-sectional view. When chemically strengthening the bent glass, application of CS and DOL may be uneven. Those problems can be solved by carrying out the annealing step. The annealing step enables post-cutting after forming and also enables uniform chemical strengthening. As a result, a bent glass having satisfactory accuracy of an external shape and uniform stress is obtained. Therefore, even a large glass such as a glass used in interior parts of transportation machine, such as in-vehicle display front plates, can be homogenously manufactured with high quality and high accuracy of external shape.

In the annealing step, temperature rising of heating a glass substrate to a desired temperature, temperature keeping of keeping the glass substrate at a desired temperature and annealing of gradually cooling the temperature-kept glass substrate are carried out. The annealing step has the effect of removing residual strain and residual stress in the glass substrate. When a desired shape has been given to the glass substrate in the forming step, large residual stress may be generated. In the glass substrate having residual stress, disadvantage that strengthening treatment becomes heterogeneous is generated.

Therefore, residual stress is removed by subjecting the glass substrate to the annealing step, and a homogeneous glass can be obtained.

Radiation heating or convection heating is preferably used as the heating method in the annealing step. When the radiation heating is used, heating-cooling cycle can be shortened in mass-production of a bent glass. Therefore, tact time in the annealing step can be shortened, and as a result, production efficiency of a bent glass can be improved. When the convection heating is used, in-plane temperature distribution of the substrate 31 can be uniformed, and in-plane stress of the bent glass finally obtained can be uniformly removed. As a result, the bent glass having less individual difference can be manufactured. Both the radiation heating and the convection heating may be simultaneously used.

It is preferred in the temperature rising in the annealing step that the substrate 31 is heated such that the equilibrium viscosity of the substrate 31 reaches $10^{12.5}$ to $10^{17}$ Pa·s. The desired annealing temperature in the annealing step is preferably about 550° C.

Temperature keeping in the annealing step is preferably conducted by maintaining the substrate 31 heated to the annealing temperature for, for example, 10 to 60 minutes. The reason for this is that the substrate can be cooled to room temperature while suppressing creep deformation. As the case may be, temperature keeping may be conducted at the keeping temperature set to lower than the heating temperature in the temperature rising. The term "creep deformation"

used herein means, for example, the phenomenon where the shape of the substrate 31 deforms with the lapse of time when the substrate 31 is heated and maintained such that the equilibrium viscosity of the substrate 31 reaches $10^{12.5}$ to $10^{17}$ Pa·s.

In the annealing in the annealing step, for example, the substrate 31 is cooled in a temperature lowering rate of preferably 0.3 to 10° C./min, and more preferably 0.3 to 5° C./min. Thereby, the generation of temperature distribution in the substrate 31 is prevented, and as a result, the generation of residual stress by temperature distribution can be suppressed. The end point of annealing is, for example, the temperature where the substrate 31 reaches room temperature, and the equilibrium viscosity is $10^{17.8}$ Pa·s or more.

Figure 5:
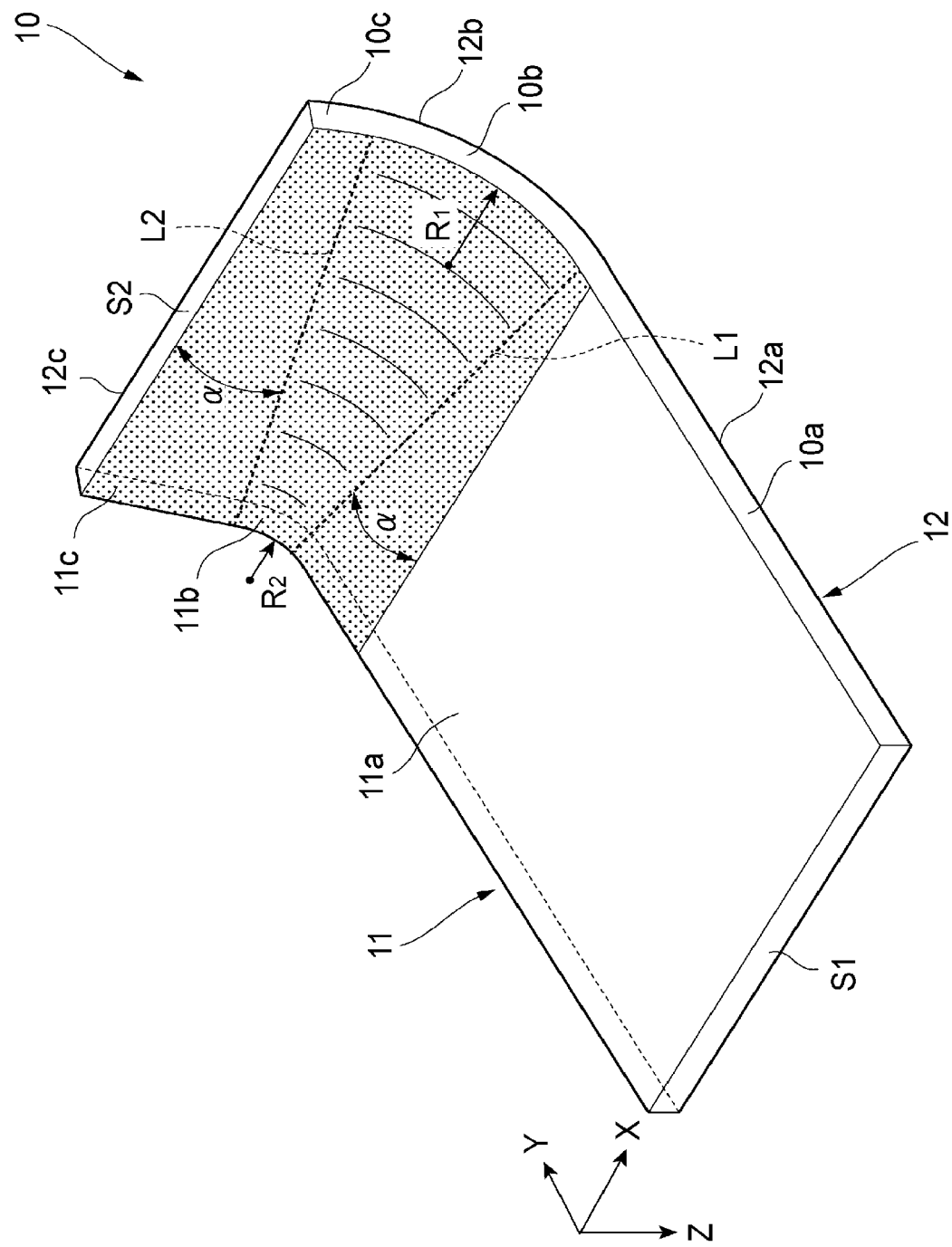
FIG. 5 is a perspective view of a bent substrate obtained by forming steps.

FIG. 5 is a perspective view of the bent substrate 10 obtained by the above step.

The bent substrate 10 has a bent part 10b at one end in Y direction. In the bent substrate 10 illustrated in the drawing, the one main surface 11 (upper surface in the drawing) is a surface contacting the support member 21 (see FIG. 3), and the other main surface 12 (lower surface in the drawing) is a non-contact surface.

Surface roughness $Ra_1$ of a bent part 11b in the one main surface 11 of the bent substrate 10 is larger than surface roughness $Ra_2$ of a first plane part 11a on the one main surface 11.

Therefore, in the bent part 11b, wettability to a resin, a solvent and the like used in the formation of a print layer and a resin layer is higher than that of the first plane part 11a. Therefore, a resin, a solvent and the like become more wettable to the bent part 11b, and as a result, contact area between a print layer or adhesive layer and a glass increases, and those are strongly fixed by an anchor effect. For this reason, when the bent part 11b is a print surface on which a print layer is formed, fixation of the print layer is satisfactory, and this is advantageous. For example, when the bent substrate 10 having a print layer formed thereon is assembled in a final product, the bent substrate 10 must be deformed. In this case, the bent part 10b is sometimes bent, thereby the print layer may be damaged. As described above, the damage of the print layer can be greatly suppressed by strongly fixing the print layer to the bent part 11b.

Second plane part 11c may have roughness same with a mold (the support member 21 of the forming apparatus 100) contact surface of either of the first plate part 11a and the bent part 11b, and may suppress roughness without contacting a mold. A method for making the second plane part 11c not contact to the mold includes, setting the mold surface 41 of the support member 21 to be shorter than the second region 31a of the substrate 31, controlling the temperature to make the second plane part 11c not contact to the mold or the like.

The roughness $Ra_1$ is preferably 1 nm or more in terms of an arithmetic average roughness. This roughness can enhance adhesive force by an anchor effect and can improve wettability of the print layer. The upper limit of the roughness is preferably 5,000 nm or less. The reason for this is to maintain the appearance satisfactory. To obtain the same effect further strongly, the roughness is more preferably 5 nm or more and 1,000 nm or less.

The lower limit of the roughness $Ra_2$ in terms of an arithmetic average roughness is not particularly limited, but is preferably 0.1 nm or more. The upper limit of the roughness is preferably 50 nm or less. The reason for this is for the maintenance of appearance and easy optical design such as coating. To obtain the same effect further strongly, the roughness is more preferably 0.5 nm or more and 5.0 nm or less.

The other main surface 12 of the bent substrate 10 has the following properties.

The other main surface 12 is a mold non-contact surface, and roughness $Ra_3$ of the bent part 12b is larger than roughness $Ra_4$ of the first plane part 12a and second plane part 12c.

Therefore, antiglare property can be given to the bent part 12b. Furthermore, three-dimensionality can be given to the appearance of the first plane part 12a, second plane part 12c and bent part 12b. Additionally, AFP (anti-finger print) effect making attachment of sebum and fingerprint to a contact surface of a user difficult is improved. Other than those, sheet adhesiveness can be improved when attaching a resin sheet such as a decorative film to an outer surface.

The roughness $Ra_3$ is preferably 4 nm or more in terms of an arithmetic average roughness. The reason for this is that antiglare property can be given. The roughness is preferably 50 nm or less. The reason for this is that the appearance is excellent. To obtain the same effect further strongly, the roughness is more preferably 5 nm or more and 10 nm or less. The roughness $Ra_4$ is preferably 1 nm or more in terms of an arithmetic average roughness. The reason for this is that the appearance is excellent. The roughness is preferably 10 nm or less. The reason for this is that a display is adhered to the flat part in many cases, and glare can be suppressed. To obtain the same effect further strongly, the roughness is more preferably 2 nm or more and 5 nm or less.

The surface roughness of the edge face of the bent substrate 10 is preferably smaller than the surface roughness of the bent part 12b. In this case, the appearance of the edge face is beautiful, and edge face strength can be improved as compared with the in-plane strength.

When the absolute value of the difference of curvature radius is $|R_1-R_2|$, and the distance in X axis direction between the points where $R_1$ and $R_2$ were measured is a in FIG. 5, curvature gradient $|R_1-R_2|/a$ is preferably 0.01 or more and 8 or less. The reason for this is that adaptability of design to peripheral members is high. Furthermore, rigidity as a structure is increased, and careless deformation when assembling and using can be suppressed. To obtain the same effect further strongly, the curvature gradient is more preferably 0.1 or more and 6 or less.

Plate thickness of the bent part 10b of the bent substrate 10 may be smaller than a plate thickness other than the bent part 10b. Thereby, the bent part 10b in which rigidity is strengthened by its shape can be relatively thinned, weight can be decreased, and visibility through the bent substrate 10 is improved. Furthermore, there is a merit that the bent part deforms flexibly against impact from the outside, and is therefore difficult to break.

Ratio $(t_1/t_2)$ between a plate thickness $t_1$ of the bent part 10b and a plate thickness $t_2$ of the first plane part 10a and second plane part 10c other than the bent part 10b is preferably 0.8 or more and 1.0 or less. The reason for this is that strength of the bent substrate 10 can be sufficiently secured. Furthermore, $t_1/t_2$ is more preferably 0.8 or more and 0.95 or less, and still more preferably 0.85 or more and 0.95 or less. The reason for this is that the bent substrate 10 can be prevented from damaging as the bent part 10b can be made to be flexibly deformed.

Crossing angle α between a virtual line L1 connecting start points of the bent part 10b of the bent substrate 10 and one side of the edge face of the bent substrate 10 (edge faces S1 and S2 at the edge in Y direction in the drawing) satisfies $0°<\alpha<90°$.

The relationship of β-OH value between a mold contact surface and a mold non-contact surface is preferably that β-OH value of the mold contact surface is larger than β-OH value of the mold non-contact surface.

The β-OH value used herein is obtained by the following formula (1) and is an index for properly controlling stress value CS of a compressive stress layer and its depth DOL and controlling a softening point.

$$\beta\text{-OH value}=(1/t)\log_{10}(T_1/T_2) \quad (1)$$

t: Thickness (mm) of glass
$T_1$: Light transmittance (%) at 3,846 cm$^{-1}$
$T_2$: Minimum light transmittance (%) in the vicinity of 3,500 cm$^{-1}$ The β-OH value can be obtained by the above formula (1) by measuring transmittance of a glass using Fourier transform infrared spectrophotometer FT-IR.

The β-OH value can be controlled, for example, as follows.

(1) Raw material having large water content is used
(2) Water is added to raw material
(3) Component decreasing amount of water in glass is reduced or is not used
(4) During melting, oxygen combustion is used
(5) Water vapor amount in glass melting facilities is increased
(6) Water vapor is bubbled in molten glass By the above, the β-OH value is set to proper value in the contact surface and non-contact surface to the support member 21, and as a result, chemical strength properties can be controlled and mechanical strength can be controlled. By making a surface having large β-OH value of a glass obtained by chemically strengthening the obtained glass face to the surface of a user, scratch resistance can be improved, and by making a surface having small β-OH value face to a non-contact surface of a user, the glass can be made difficult to break even though a user contact surface has received strong impact.

The relationship of β-OH value between the flat parts (first flat part and second flat part) and the bent part is that the β-OH value of the bent part is larger than that of the flat parts. This can be achieved by making the heating temperature when forming satisfy flat parts<bent part. In the annealing step, temperature history of the bent glass can be reset, but β-OH value remains unchanged.

According to the above step, the difference between the maximum deviation and the minimum deviation from design shape such as the dimension, curvature radius and bending depth of the bent substrate 10 can be set to 0.6 or less. According to this, design followability to peripheral members is improved when assembling the bent substrate 10.

(Other Forming Method)

The method for forming a bent substrate described above is one example, and a part of its procedures can be changed.

For example, the surface of the mold surface 41 of the support member 21 may have a groove capable of transferring a rough cutting line or the like of a substrate. In other words, boundary distortion obtained by the process that a vacuum drawing path has been transferred to a substrate for realizing the formation of a bent part may be utilized as an alignment mark. The boundary distortion is a linear or circular projection.

Figure 6:
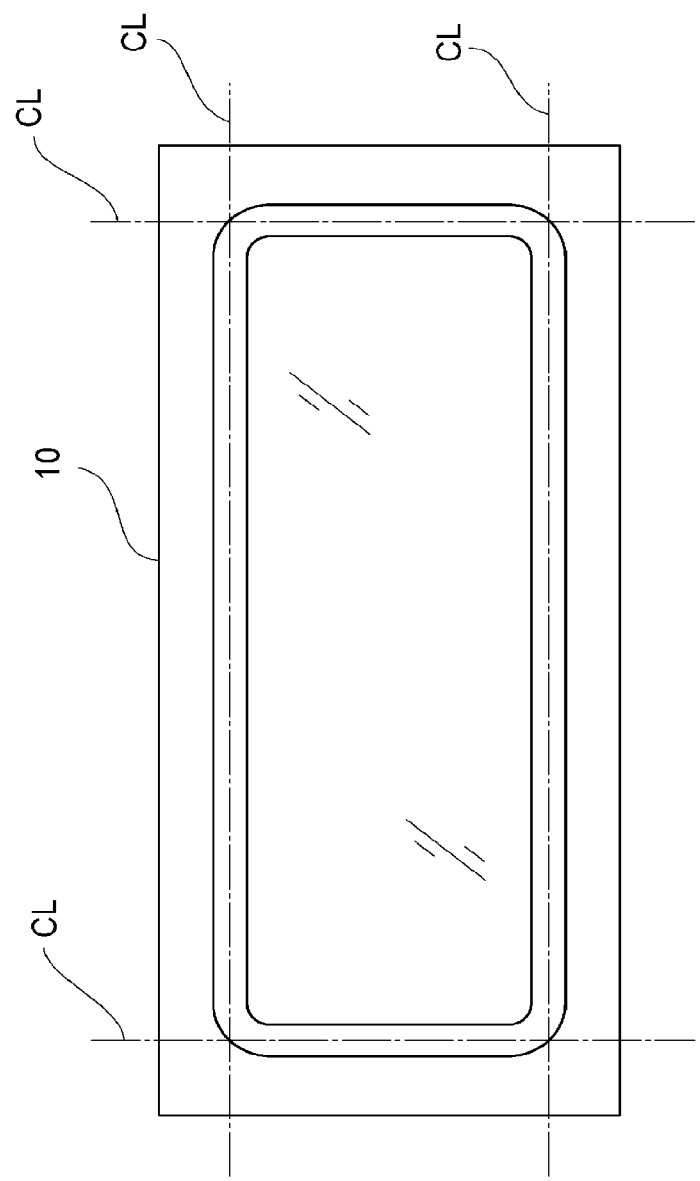
FIG. 6 is a plane view of a bent substrate having a cutting line formed thereon.

Therefore, the boundary distortion is preferably used for a cutting line CL such as a rough cutting line or an actual cutting line, as illustrated in FIG. 6.

Figure 7:
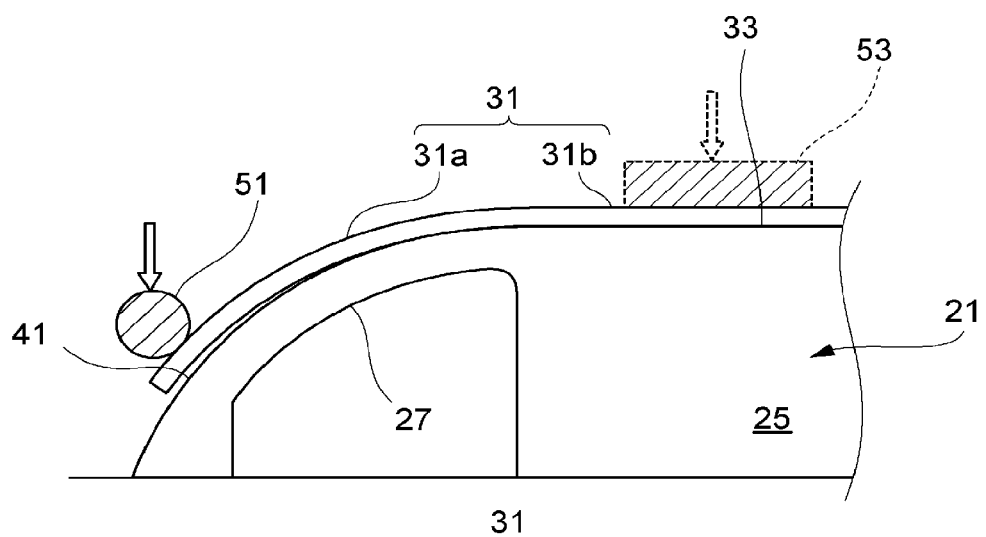
FIG. 7 is a step explanation view illustrating the state of bending a second region of a substrate by a pusher.

In the forming apparatus 100 described above, the bent part is formed by vacuum suction. However, the bent part may be formed on the substrate 31 by using a pusher 51 separately applying external force to the substrate 31 as illustrated in FIG. 7. In this case, it is preferred that the pusher 51 is brought into contact with an outer edge part of the substrate, and the outer edge part is finally removed by cutting chamfering.

Other than the pusher 51 pushing the second region 31a of the substrate 31, a pusher 53 pushing the first region 31b of the substrate 31 may be concurrently used. Other than the use of a pusher, the constitution of generating pressure difference between an upper surface and a lower surface of the substrate 31 and forming a bent part may be used.

The bent substrate consisting of a glass plate described above can be used in various uses. Examples of the uses include in-vehicle parts (head light cover, side mirror, front transparent substrate, side transparent substrate, rear transparent substrate, and the like), meters, building windows, show windows, building interior members, building exterior members, front plates (notebook-sized personal computer, monitor, LCD, PDP, ELD, CRT, PDA and the like), LCD color filters, substrates for touch panel, pick-up lenses, cover substrates for CCD, transparent substrates (cover glasses and the like) for solar cells, mobile phone windows, organic EL light-emitting element parts, inorganic EL light-emitting element parts, fluorescent light-emitting element parts, optical filters, lighting lamps, lighting instrument covers, anti-reflective films, polarizing films and the like. In particular, the bent substrate is preferably used in a glass plate mounted on transportation machine such as automobiles, electric trains, ships and aircrafts. Glasses having large size, large bending depth and a bent part having twist are required in glass plates of those uses, and the bent substrate having the constitution of the present invention is suitable for those uses. Furthermore, when the bent substrate 10 comprising a glass plate is used in interior parts of transportation machine, such as instrument panel, head up display (HUD), dashboard, center console, shift knob, in-vehicle display front plate and the like, high design and luxury feeling can be given to the interior parts, and interior design of transportation machines can be improved.

Although the present invention has been described in detail and by reference to the specific embodiments, it is apparent to one skilled in the art that various modifications or changes can be made without departing the spirit and scope of the present invention.

This application is based upon Japanese Patent Application (No. 2017-095985), filed on May 12, 2017, the contents of which are incorporated herein by reference.

As described above, the present specification discloses the following inventions.

(1) A method for manufacturing a bent substrate, which forms a bent part in at least a part of a substrate, in which the substrate includes a second region which is subjected to forming and includes the bent part and a first region which is not subjected to forming, the method for manufacturing including:

supporting the first region of the substrate on a substrate support surface of a support member including a mold surface having a same curved surface shape as that of the bent part and the substrate support surface that supports the first region, in a state of facing the second region of the substrate to the mold surface;

heating the second region of the substrate to soften the second region of the substrate by the heating;

placing the second region along the mold surface of the support member by an own weight of the second region; and transferring the curved surface shape of the mold surface to the second region by an external force.

According to this method for manufacturing a bent substrate, a bent substrate is obtained without involving large change of a plate thickness. Furthermore, because the second region is closely contacted with the mold surface by external force, a bent shape is transferred in high accuracy. Moreover, because the mold surface of the support member can have optional shape, the shape of the bent part is not greatly restricted.

(2) The method for manufacturing a bent substrate as described in (1) above, in which the bent part has a twist structure.

According to this method for manufacturing a bent substrate, even though the bent part has a complicated three-dimensional shape, the bent substrate can be easily formed.

(3) The method for manufacturing a bent substrate as described in (2) above, in which the twist structure includes sites having different curvature radii in at least one of the bent part.

According to this method for manufacturing a bent substrate, a shape of the mold surface is transferred. Therefore, even though the bent part has sites having different curvature radii present therein, the bent substrate can be easily formed.

(4) The method for manufacturing a bent substrate as described in (2) above, in which the twist structure is a structure where a crossing angle α between a virtual line connecting start points of the bent part of the bent substrate and one side of an edge face of the bent substrate satisfies 0°<α<90°.

According to this method for manufacturing a bent substrate, even though the bent part has a structure where a virtual line starting bending is inclined at an angle between a direction along an edge face of the bent substrate and an orthogonal direction thereof, the bent substrate can be easily formed.

(5) The method for manufacturing a bent substrate as described in (1) above, in which the bent substrate has an S-shaped structure in a cross-sectional view of a thickness direction of the bent substrate.

According to this method for manufacturing a bent substrate, even the bent substrate having an S-shaped structure in a cross-sectional view of a thickness direction can be prepared in satisfactory accuracy of the curvature radius and dimension of the bent part.

(6) The method for manufacturing a bent substrate as described in (1) above, in which the curved surface shape of the mold surface is transferred to the second region by the external force after the second region of the substrate has come into contact with the mold surface and a sagging rate has reached 5 mm/sec or less.

The "contact with" used herein means that the second region of the substrate starts being formed by touching with a part of the mold surface having an average curvature radius of 1,000 mm or less. According to this method for manufacturing a bent substrate, the substrate is deformed by its own weight during the substrate deforms in the sagging rate exceeding 5 mm/sec, thereby the influence of wrinkles and the like by applying excessive external force can be reduced, and the bent substrate is efficiently obtained.

(7) The method for manufacturing a bent substrate as described in (1) above, in which the external force is a force generated by vacuum suction.

According to this method for manufacturing a bent substrate, the method uses a method of vacuum sucking the substrate. Therefore, a trace of the point of application of an external force is difficult to remain on the substrate as compared with the case of giving external force involving local contact to a substrate.

(8) The method for manufacturing a bent substrate as described in (1) above, in which during transferring the curved surface shape of the mold surface to the second region, a recessed part formed on the mold surface is vacuum sucked to make the second region closely contact with the mold surface.

According to this method for manufacturing a bent substrate, the bent substrate is vacuum sucked in the recessed part, thereby suction force is concentrated in the recessed part, and the substrate is efficiently deformed.

(9) The method for manufacturing a bent substrate as described in (8) above, in which the recessed part is formed corresponding to an outer edge shape of the substrate.

According to this method for manufacturing a bent substrate, the substrate is sucked at the recessed part provided at a position corresponding to an outer edge shape of the second region. Therefore, the shape of the mold surface inside the recessed part can be surely transferred to the substrate.

(10) The method for manufacturing a bent substrate as described in (8) above, in which the recessed part is a continuous groove along the outer edge of the substrate.

According to this method for manufacturing a bent substrate, the substrate is sucked by the continuous groove along the outer edge of the substrate, and adhesiveness between the substrate and the mold surface is increased. As a result, the accuracy of shape transferring can be further improved.

(11) The method for manufacturing a bent substrate as described in (10) above, in which the substrate is cut along a facing position to the groove after transferring the curved surface shape of the mold surface to the second region.

According to this method for manufacturing a bent substrate, groove mark formed on the substrate can be utilized as an alignment mark by cutting the substrate at a position facing the groove. As a result, positional accuracy of cutting processing can be improved and the groove mark of the substrate can be removed by cutting.

(12) The method for manufacturing a bent substrate as described in (1) above, in which the external force is a pressing force pressing the substrate toward the mold surface.

According to this method for manufacturing a bent substrate, the substrate is directly pressed and further secure deformation is possible.

(13) The method for manufacturing a bent substrate as described in (1) above, in which the substrate comprises a glass.

According to this method for manufacturing a bent substrate, a glass having many restrictions in a processing method can be formed into an optional shape in high accuracy without involving large change of a plate thickness.

(14) A bent substrate having a bent part in at least a part thereof, in which the bent substrate has a one main surface and the other main surface opposite to the one main surface, and a surface roughness of the bent part on the one main surface of the bent substrate is larger than the surface roughness of a region other than the bent part on the one main surface.

According to this bent substrate, the surface roughness of the bent part on the one main surface is larger than the surface roughness of the other area thereof, and as a result, a print layer and a resin layer, formed on the bent part can be satisfactorily fixed.

(15) The bent substrate as described in (14) above, in which the surface roughness of the bent part on the other main surface is larger than the surface roughness of a region other than the bent part on the other main surface.

According to this bent substrate, antiglare property and AFP effect can be given to the bent part, and additionally, sheet adhesiveness can be improved when attaching a resin sheet.

(16) The bent substrate as described in (15) above, in which the surface roughness of the bent part on the one main surface and the other main surface is larger than the surface roughness of the one main surface and the other main surface other than the bent part.

According to this bent substrate, the surface of the substrate other than the bent part can be more flattened than the bent part. As a result, assembling into other members is easy and beauty of surface properties is maintained.

(17) The bent substrate as described in (15) above, in which the bent part on the one main surface of the bent substrate is a recessed surface, and the bent part on the other main surface of the bent substrate is a projected surface corresponding to the recessed surface.

In this bent substrate, a bent part and an area other than the bent part are easily obtained in a plate-like substrate to be formed. The surface roughness of the bent part is larger than that of the other part in the one main surface, and as a result, a print layer and resin layer formed on the bent part can be satisfactorily fixed. Furthermore, antiglare property and AFP effect can be given to the bent part in the other main surface, and additionally, sheet adhesiveness can be improved when attaching a resin sheet.

(18) The bent substrate as described in (14) above, in which a plate thickness of the bent part is smaller than a plate thickness of the region other than the bent part.

According to this bent substrate, weight of the bent substrate can be reduced, and visibility through the bent substrate is improved. Furthermore, the bent substrate flexibly deforms against impact from the outside, and is therefore difficult to break.

(19) The bent substrate as described in (14) above, in which the surface roughness of an edge face is smaller than the surface roughness of the bent part.

According to this bent substrate, the appearance of the edge face is improved. Furthermore, strength of the edge face is increased, and the bent substrate is difficult to break from the edge face.

(20) The bent substrate as described in (14) above, in which at least one of the bent part includes sites having different curvature radii.

According to this bent substrate, the bent part can be shaped into a complicated shape having different curvature radii.

(21) The bent substrate as described in (14) above, in which a β-OH value of the one main surface is larger than the β-OH value of the other main surface.

According to this bent substrate, for a contact surface and a non-contact surface, chemical strengthening properties can be controlled and mechanical strength can be controlled, by adjusting those β-OH values to the respective appropriate values.

(22) The bent substrate as described in (21) above, in which the β-OH value of the bent part is larger than the β-OH value of the region other than the bent part.

According to this bent substrate, in the bent part of the bent substrate, by making the surface having small β-OH value face to a user side, scratch resistance can be improved, and by making the surface having large β-OH value face to a non-contact surface of a user, the bent substrate can be made difficult to break even though the contact surface of a user receives strong impact.

(23) The bent substrate as described in (14) above, comprising a glass.

According to this bent substrate, a glass having many restrictions in a processing method can be formed into an optional shape in high accuracy without involving great change of a plate thickness.

DESCRIPTION OF REFERENCE NUMERALS AND SIGNS

10 Bent substrate
11 Main surface
11a First plane part
11b Bent part
11c Second plane part
12 Main surface
12a First plane part
12b Bent part
12c Second plane part
21 Support member
23 Heater
27 Bent part forming section
31 Substrate
31a Second region
31b First region
33 Substrate supporting surface
Groove (recessed part)
41 Mold surface
43 Groove (recessed part)
51, 53 Pusher
100 Forming apparatus
$R_1$ Curvature radius
$R_2$ Curvature radius

The invention claimed is:

1. A bent substrate having a bent part in at least a part thereof, wherein
   the bent substrate has a one main surface and the other main surface opposite to the one main surface, and
   a surface roughness $Ra_1$ of the bent part on the one main surface of the bent substrate is larger than a surface roughness $Ra_2$ of a region other than the bent part on the one main surface,
   wherein the surface roughness $Ra_1$ of the bent part on the one main surface is 1 nm or more and 5,000 nm or less in terms of an arithmetic average roughness,
   wherein a surface roughness $Ra_3$ of the bent part on the other main surface is larger than a surface roughness $Ra_4$ of a region other than the bent part on the other main surface, and
   wherein the bent substrate comprises a glass.

2. The bent substrate according to claim 1, wherein
   the surface roughness $Ra_1$ of the bent part on the one main surface is larger than the surface roughness $Ra_2$ of the region other than the bent part on the one main surface, the surface roughness $Ra_1$ of the bent part on the one main surface is larger than the surface roughness $Ra_4$ of region other than the bent part on the other main surface, the surface roughness $Ra_3$ of the bent part on the other main surface is larger than the surface roughness $Ra_2$ of region other than the bent part on the one main surface, and the surface roughness $Ra_3$ of the bent part on the other main surface is larger than the surface roughness $Ra_4$ of the region other than the bent part on the other main surface.

3. The bent substrate according to claim 1, wherein the bent part on the one main surface of the bent substrate includes recesses, and the bent part on the other main surface of the bent substrate includes projections corresponding to the recesses.

4. The bent substrate according to claim 1, wherein a plate thickness of the bent part is smaller than a plate thickness of the region other than the bent part.

5. The bent substrate according to claim 1, wherein a surface roughness of an edge face is smaller than the surface roughness $Ra_1$ of the bent part on the one main surface and smaller than the surface roughness $Ra_3$ of the bent part on the other main surface.

6. The bent substrate according to claim 1, wherein at least one of the bent part includes sites having different curvature radii.

7. The bent substrate according to claim 1, wherein a β-OH value of the one main surface is larger than the β-OH value of the other main surface.

8. The bent substrate according to claim 7, wherein the β-OH value of the bent part is larger than the β-OH value of the region other than the bent part.

9. A method for manufacturing a bent substrate according to claim 1, which forms a bent part in at least a part of a substrate, wherein the substrate includes a second region which is subjected to forming and includes the bent part and a first region which is not subjected to forming, the method for manufacturing comprising:

supporting the first region of the substrate on a substrate support surface of a support member comprising a mold surface having a same curved surface shape as that of the bent part and the substrate support surface that supports the first region, in a state of facing the second region of the substrate to the mold surface;

heating the second region of the substrate to soften the second region of the substrate by the heating;

placing the second region along the mold surface of the support member by an own weight of the second region; and transferring the curved surface shape of the mold surface to the second region by an external force.

10. The method for manufacturing a bent substrate according to claim 9, wherein the bent part has a twist structure.

11. The method for manufacturing a bent substrate according to claim 10, wherein the twist structure includes sites having different curvature radii in at least one of the bent part.

12. The method for manufacturing a bent substrate according to claim 10, wherein the twist structure is a structure where a crossing angle α between a virtual line connecting start points of the bent part of the bent substrate and one side of an edge face of the bent substrate satisfies $0°<\alpha<90°$.

13. The method for manufacturing a bent substrate according to claim 9, wherein the bent substrate has an S-shaped structure in a cross-sectional view of a thickness direction of the bent substrate.

14. The method for manufacturing a bent substrate according to claim 9, wherein the curved surface shape of the mold surface is transferred to the second region by the external force after the second region of the substrate has come into contact with the mold surface and a sagging rate has reached 5 mm/sec or less.

15. The method for manufacturing a bent substrate according to claim 9, wherein the external force is a force generated by vacuum suction.

16. The method for manufacturing a bent substrate according to claim 9, wherein during transferring the curved surface shape of the mold surface to the second region, a recessed part formed on the mold surface is vacuum sucked to make the second region closely contact with the mold surface.

17. The method for manufacturing a bent substrate according to claim 16, wherein the recessed part is formed corresponding to an outer edge shape of the substrate.

18. The method for manufacturing a bent substrate according to claim 16, wherein the recessed part is a continuous groove along the outer edge of the substrate.

19. The method for manufacturing a bent substrate according to claim 18, wherein the substrate is cut along a facing position to the groove after transferring the curved surface shape of the mold surface to the second region.

20. The method for manufacturing a bent substrate according to claim 9, wherein the external force is a pressing force pressing the substrate toward the mold surface.

21. The method for manufacturing a bent substrate according to claim 9, wherein the substrate comprises a glass.

* * * * *